United States Patent [19]

Walker et al.

[11] Patent Number: 5,771,395
[45] Date of Patent: Jun. 23, 1998

[54] SYSTEM FOR PROCESSING INFORMATION FROM SCANNED DOCUMENTS USING EVENT DRIVEN INTERFACE WITH PATTERNS LOADED IN RAM AND WITH ADDRESS GENERATOR FOR ADDRESSING BIT PATTERNS

[75] Inventors: James R. Walker, Warrenton; Paul C. Hershey, Manassas, both of Va.

[73] Assignee: Lockheed Martin Corporation, Bethesda, Md.

[21] Appl. No.: 635,842

[22] Filed: Apr. 22, 1996

[51] Int. Cl.⁶ .................................................. G06F 7/00
[52] U.S. Cl. ..................... 395/836; 358/474; 358/460; 358/444
[58] Field of Search ......................... 382/36; 370/17; 395/821, 788, 836; 361/514 C; 358/474, 460, 444

[56] References Cited

U.S. PATENT DOCUMENTS

| | | | |
|---|---|---|---|
| 4,464,733 | 8/1984 | Misker et al. | 395/821 |
| 4,965,763 | 10/1990 | Zamora | 704/1 |
| 5,168,444 | 12/1992 | Cukor et al. | 705/1 |
| 5,291,592 | 3/1994 | Kita | 707/104 |
| 5,305,396 | 4/1994 | Betts et al. | 382/36 |
| 5,325,527 | 6/1994 | Cwikowski et al. | 395/200.52 |
| 5,365,514 | 11/1994 | Hershey et al. | 370/17 |
| 5,493,689 | 2/1996 | Waclawsky et al. | 395/821 |
| 5,526,283 | 6/1996 | Hershey et al. | 361/514 C |
| 5,623,681 | 4/1997 | Rivette et al. | 395/788 |

*Primary Examiner*—Thomas C. Lee
*Assistant Examiner*—David Ton
*Attorney, Agent, or Firm*—Lane, Aitken & McCann

[57] ABSTRACT

The present invention discloses a system for processing data from scanned documents. The output from a scanner serves as input to a digital filter referred to as an event driven interface. The event driven interface is user-configured with bit patterns to identify and filter out user-designated information from a scanned document. Since only the designated information is extracted from the document, and not extraneous matter of the document, the subsequent storage of only the designated information saves computer memory. Furthermore, the designated information can be transmitted over a data communications network. Such a transmission will occupy less bandwidth than if the entire document was transmitted.

1 Claim, 5 Drawing Sheets

SYSTEM FOR PROCESSING INFORMATION FROM SCANNED DOCUMENTS USING EVENT DRIVEN INTERFACE WITH PATTERNS LOADED IN RAM AND WITH ADDRESS GENERATOR FOR ADDRESSING BIT PATTERNS

BACKGROUND OF THE INVENTION

A. Field of the Invention

The present invention relates to an improved method for processing data from scanned documents and more particularly to the use of a simple hardware filter to extract from a document only user-designated information. This information can be transmitted over a data communications network for processing by remote stations on the network, or it may be processed by a local station connected to the scanner.

B. Related Applications

This patent application is related to U.S. Pat. No. 5,375,070, which issued on Dec. 20, 1994 from application Ser. No. 08/024,572, which was filed Mar. 1, 1993, entitled "Information Collection Architecture and Method for a Data Communications Network," by J. G. Waclawsky, Paul C. Hershey, Kenneth J. Barker and Charles S. Lingafelt, Sr., assigned to the IBM Corporation and incorporated herein by reference.

This patent application is related to U.S. Pat. No. 5,365,514, which issued on Nov. 15, 1994 from application Ser. No. 08/024,575, which was filed Mar. 1, 1993, entitled "Event Driven Interface for a System for Monitoring and Controlling a Data Communications Network," by Paul C. Hershey, J. G. Waclawsky, Kenneth J. Barker and Charles S. Lingafelt, Sr., assigned to the IBM Corporation and incorporated herein by reference.

This patent application is related to U.S. Pat. No. 5,493,689, which issued on Feb. 20, 1996 from application Ser. No. 08/024,542, which was filed Mar. 1, 1993, entitled "System and Method for Configuring an Event Driven Interface and Analyzing Its Output for Monitoring and Controlling a Data Communications Network," by J. G. Waclawsky and Paul C. Hershey.

C. Background Art

A typical optical scanner uses photosensors to scan the text of a document and complex character recognition software to transform the scanned document in pixel formation into a computer compatible digital code. This computer compatible code is commonly an unstructured file, which can then be manipulated with word processing software. However, subsequent manipulation with a word processor requires human intervention which is slow and prone to error.

A scanner reads all of the printed matter which appears on a document and puts it all into the unstructured file. For example, if a completed questionnaire or other form is scanned, not only is the information entered into the form stored in memory, but also the questions, prompts and other extraneous matter of the form.

In addition to having the capability to manipulate a scanned document at the scanning site with word processing software, one can transmit scanned document data over a data communications network. There are, however, some shortcomings associated with the transmission of a scanned document over a network. Since all of the printed matter from the scanned document (user designated and user extraneous) is stored, transmission of that information over a data communications network may take up more bandwidth than is necessary. Furthermore, because the scanned data file is unstructured, it is a task involving more complex software and many processor cycles to extract from the scanned data the information desired when it arrives at a destination station on the network. Consequently, extraction of desired information from a scanned document transmitted over a network cannot be accomplished in real time at high network speeds in the prior art.

It is an object of the present invention to identify and extract, in an online process, user-designated information scanned from a document.

It is another object of the invention to transmit this designated information over a data communications network for remote retrieval and analysis in real time.

SUMMARY OF THE INVENTION

The present invention relates to a scanning system in which a digital filter, referred to herein as an information collection module (disclosed in U.S. Pat. No. 5,493,689), extracts from a digital representation of a scanned document user-designated information. The invention can use any suitable commercially available scanner to scan the document. Character recognition software in such a commercially available scanner converts the output of the scanner to a character set, such as ASCII. The character set representing the scanned document is then sent through a portion of the information collection module, referred to herein as an event driven interface. The event driven interface is user-configured with bit patterns placed into a random access memory associated therewith to filter out user-designated information from the character set representing the document. For example, if a form requests a person's social security number via a prompt such as "Social Security Number:", the event driven interface can be configured to recognize the characters "Social Security Number:", and then to extract and store the actual social security number which follows the characters "Social Security Number:". In like manner, any information from a document can be targeted and extracted therefrom. After the event driven interface filters out the user-designated information, a formatting module formats the information and stores it in a digital memory. The format includes start and end markers along with field markers to identify each separate piece of information.

Either before or after storing the data, or without even storing the data, the system can transmit the designated information over a data communications network. After the aforementioned formatting of the selected data, the system places the formatted data into a network data frame and transmits it to a remote station on the data communications network. The station to which the designated information is being sent also has an information collection module. The event driven interface of this information collection module is user-configured with bit patterns to recognize the destination address stored in network data frame and to extract the user-designated information contained within it. Since only the user-designated information is sent over the network, and not all of the information contained in the scanned document, the invention conserves network resources. Furthermore, the information is in formatted form that the event driven interface can easily identify and process in real time.

When the network frame containing the user-designated information arrives at the destination station, the event driven interface analyzes the incoming data in a bit by bit fashion. Since this bit by bit analysis occurs in the event driven interface, which is a digital filter, rather than a processor, this analysis occurs in real time. The information that the event driven interface extracts can be immediately processed, or it can be stored for later processing.

DETAILED DESCRIPTION OF THE PREFERRED EMBODIMENTS

Figure 1:
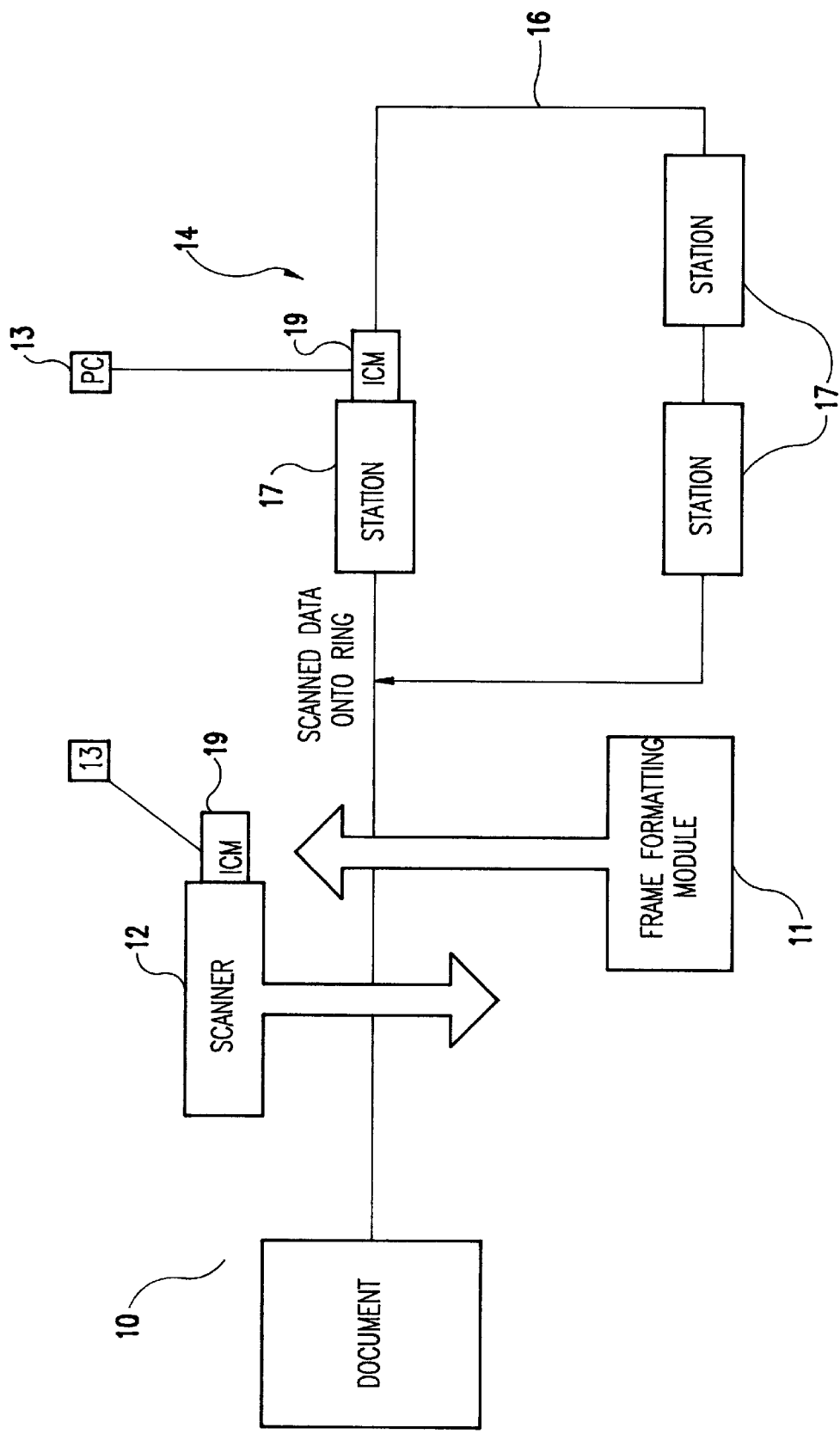
FIG. 1 illustrates the document scanning system of the present invention.

FIG. 1 illustrates a system 10 which implements the present invention. The system 10 includes a commercially available scanner 12 and a token ring data communications network 14. Although the present invention is described in relation to a token ring network, the invention will work equally well with other types of networks. An information collection module 19 is connected to the scanner 12, and it contains hardware which filters, extracts, and stores user-designated information from a digital representation of a scanned document.

The token ring network 14 has one or more stations 17, some of which have an information collection module 19 associated therewith. The stations 17 are connected together by network cable 16 to form a ring. In a preferred embodiment, the information collection module 19 is embodied in an adapter card which is installed into a personal computer system 13. The scanned data is filtered by the information collection module 19, and subsequently submitted to a frame formatting module 11. The frame formatting module 11 receives the scanned, digitized, and filtered information from the scanner 12, and formats the information before storing it into the memory of the personal computer 13. Alternatively, after formatting the information, it can further be put into a token ring frame format according to 802.5 IEEE protocol and transmitted over the token ring network 14.

Figure 2:
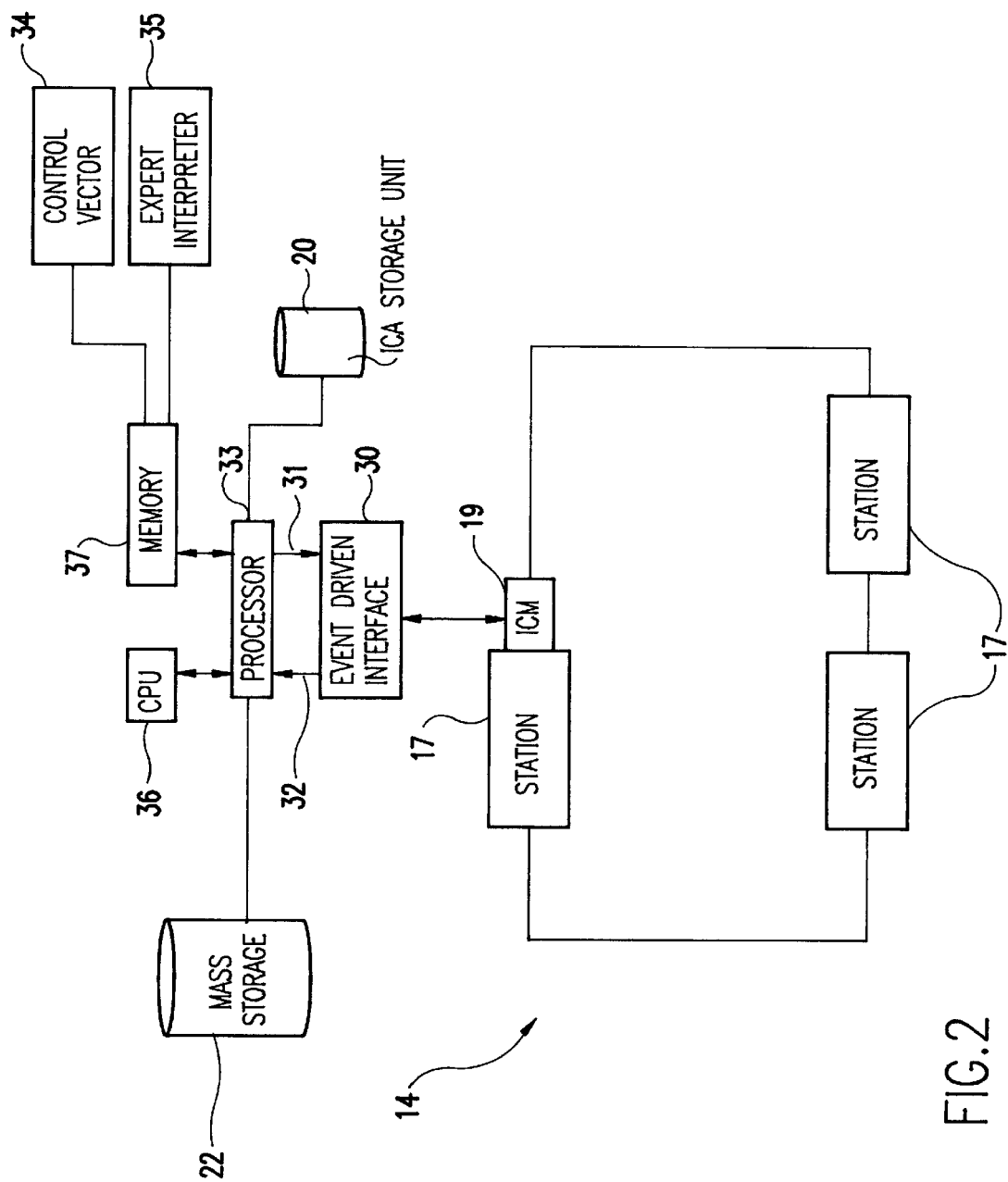
FIG. 2 illustrates the information collection module used in conjunction with the present invention.

FIG. 2 illustrates the components of the information collection module 19. The information collection module 19 includes an event driven interface 30, a processor 33, a control line 31, an event line 32, a CPU 36, memory 37, an information collection module storage unit 20, and a mass storage unit 22. One or more expert systems reside in memory 37 and in one embodiment include a control vector module 34 and an expert interpreter module 35.

Figure 3:
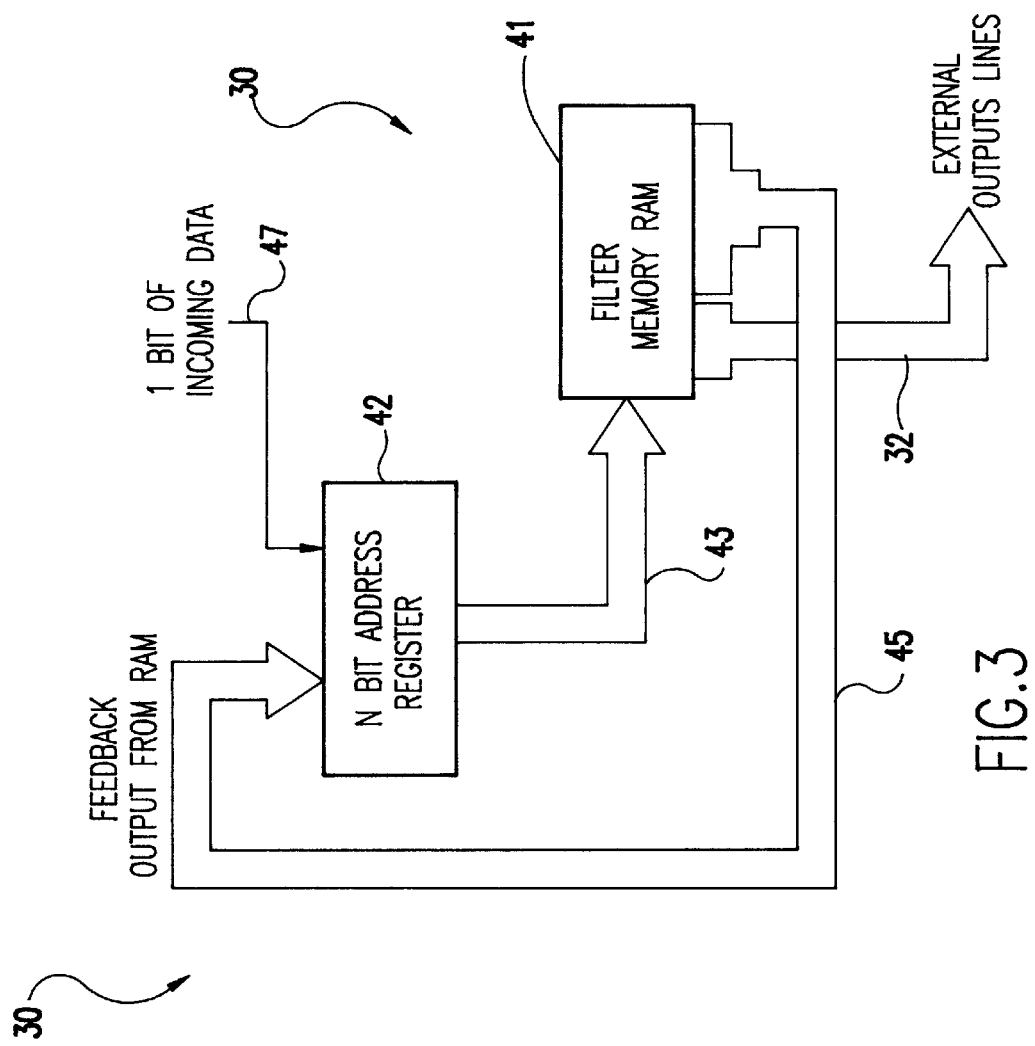
FIG. 3 illustrates the structure of an event driven interface.

The event driven interface 30 is illustrated in more detail in FIG. 3. It comprises a random access memory (RAM) 41, which acts as a filter for the user-designated information, and an N bit register 42. The event driven interface 30 uses the output of register 42 to address the RAM 41 via line 43. The least significant bits of the RAM 41 serve as input to the address register 42 via line 45. The input for the least significant bit of the register 42 comes from the token ring network 14 over line 47. The least significant output bits of the RAM 41 and the single bit from the token ring network 14 are concatenated to form the next address to be accessed in the RAM 41. The most significant output bits associated with a particular memory location in the RAM 41 that are not outputted to register 42 can be used as external outputs (i.e. event vectors E(i)) to the processor 33 via line 32, or as control bits to initiate the capture of the user-designated information.

The event driven interface 30 is a versatile, reprogrammable low cost digital filter contained within an integrated circuit chip, and it is capable of identifying user-designated data in real time as the data travels through the event driven interface 30. It performs filtering of data based on multiple user-definable patterns stored within it. The processor 33 configures the event driven interface 30 to identify data by sending control vectors C(i), which are nothing more than bit patterns, to the event driven interface 30 over line 31. These control vectors C(i) are stored in the RAM 41. The control vectors C(i) configure the event driven interface 30 to recognize data that corresponds to the bit patterns that were loaded into the RAM 41 by the processor 33. In one case, the processor 33 configures the event driven interface 30 to identify the ASCII representation of prompts and keywords from a scanned document and to extract the information following that prompt or keyword. In another case, the processor 33 configures the event driven interface 30 associated with a remote network station to identify bit representations in network data frames which are transmitted over the token ring network 14, and to extract information from the data fields of these frames. In one embodiment, the control vector generator module 34 uses a data file containing predefined control vectors that the control vector generator module 34 downloads to the event driven interface 30. In another embodiment, the control vector generator module 34 executes a filter pattern consolidation method that is described in detail in U.S. Pat. No. 5,493,689.

After identifying the user-designated information, the event driven interface 30 extracts this information via a technique known as frame capture (the details of which will be explained later). The event driven interface 30 sends this captured data to the processor 33 over line 32. The processor 33 processes this information independently of the operation of either the scanner 12 or the token ring network 14, thereby imposing no load on either one.

The system 10 of the present invention functions in detail as follows. The scanner 12 contains photosensors which record the difference in reflectance resulting from the text and background of the document, and character recognition software associated with the scanner 12 interprets these differences and transforms the scanned information into a computer compatible digital code such as ASCII. The ASCII representation of the scanned document is passed through the event driven interface 30 which identifies user-designated prompts or keywords from the ASCII text by comparing it with the bit patterns previously loaded into its RAM 41, and then proceeds to extract the information associated with those prompts.

Figure 4:
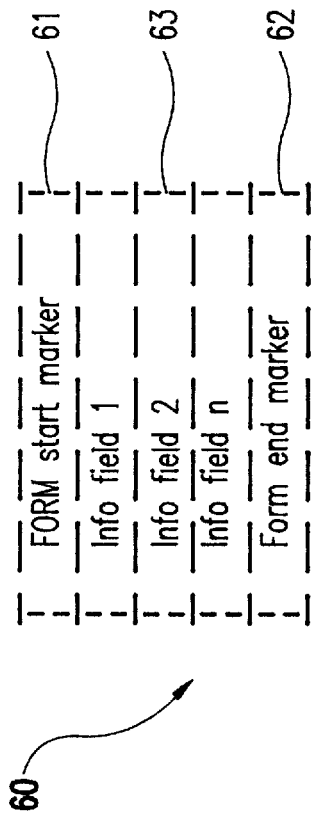
FIG. 4 illustrates the format into which the present invention places the information scanned from a document.

For example, the event driven interface 30 of scanner 12 may be configured to extract the social security number from a document. In this case, the event driven interface 30 would identify the bits of the ASCII representation of the prompt "Social Security Number:". After identifying the ASCII representation for "Social Security Number:", the event driven interface 30 captures the bits following the ASCII representation of "Social Security Number:". These bits contain the actual social security number, and they are transmitted to the processor 33. It is in the processor 33 that the frame formatting module 11 formats this user-designated information. The formatting module 11 first places this information into a structured form 60 as illustrated in FIG. 4, and then, if the data is to be transmitted over the token ring network 14, into an IEEE 802.5 token ring frame format 70 as illustrated in FIG. 5.

The structured form 60 (FIG. 4), into which the frame formatting module 11 places the user-designated information, consists of a start field 61, an end field 62, and one or more information fields 63. It is into the information fields 63 that the formatting module 11 places the user-designated information from the scanned document. If the information is not going to be transmitted over the network 14, after the information is placed in the format 60, the information is stored into mass storage unit 22 or information collection module storage unit 20.

Figure 5:
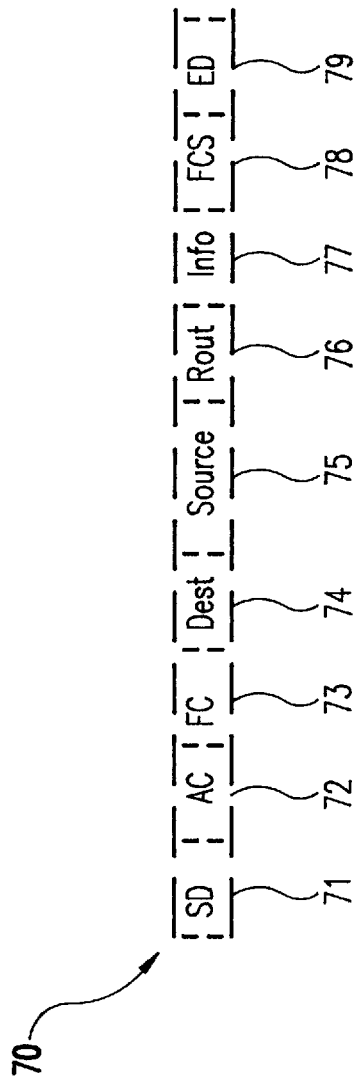
FIG. 5 illustrates a token ring frame format.

If the user-designated information is to be transmitted over the token ring network 14, the frame formatter module 11 further formats the user-designated information by placing the structured form 60 into an IEEE 802.5 token ring frame format 70 which is illustrated in FIG. 5. The token ring frame format 70 consists of a start delimiter field 71, an access control field 72, a frame control field 73, a destination field 74, a source field 75, a routing field 76, an information field 77, a frame check sequence field 78, and an end delimiter field 79.

The manner in which the event driven interface 30 actually collects the user-designated data is referred to as frame capture. The processor 33 configures the event driven interface 30 to be write-enabled by turning on one of the most significant bits in the RAM 41 which are not used for addressing purposes. When the event driven interface 30 encounters a write enable bit which is turned on, the event driven interface 30 funnels the subsequent incoming network data to a buffer. The frame formatting module 11 then formats and stores this user-designated data, or it formats and transmits this user-designated data to a remote station 17. For example, when identifying the ASCII representation of the prompt "Social Security Number:", the location in the RAM 41 which identifies the ":" after "Number" will have the write enable bit turned on. The event driven interface 30 will then place the subsequent bits, which will be the social security number, into a buffer for later processing by the frame formatting module 11.

The processor 33 places the address of the station 17 from which a network frame 70 originates into the source field 75, and the address of the station 17 to which this network frame 70 is being sent in the destination field 74. If the information is being sent to more than one location, the processor 33 will create multiple frames 70 and place the appropriate destination address in each one. The processor 33 then places an eight bit code, such as B'00001001', into the first byte of the information field 77 which permits the event driven interface 30 at the destination station 17 to identify this particular network frame 70 as a frame containing desired information which the event driven interface 30 should process. A longer code of two or more bytes could be placed into the information field 77 if desired. The processor 33 places the structured form 60 into the information field 77 immediately after the first byte (i.e. the B'00001001'). The network frame 70 is subsequently transmitted over the token ring network 14 to the station 17 whose address is in the destination field 74.

Upon arriving at the destination station 17, the event driven interface 30 associated with that station 17 first identifies this network frame 70 as one that contains desired information, and it subsequently extracts the desired information from the information field 77. The bits of the network frame 70 enter the event driven interface 30 in serial fashion, and the event driven interface 30 compares these bits with the bit pattern of the control vectors C(i) stored in the RAM 41.

Figure 6:
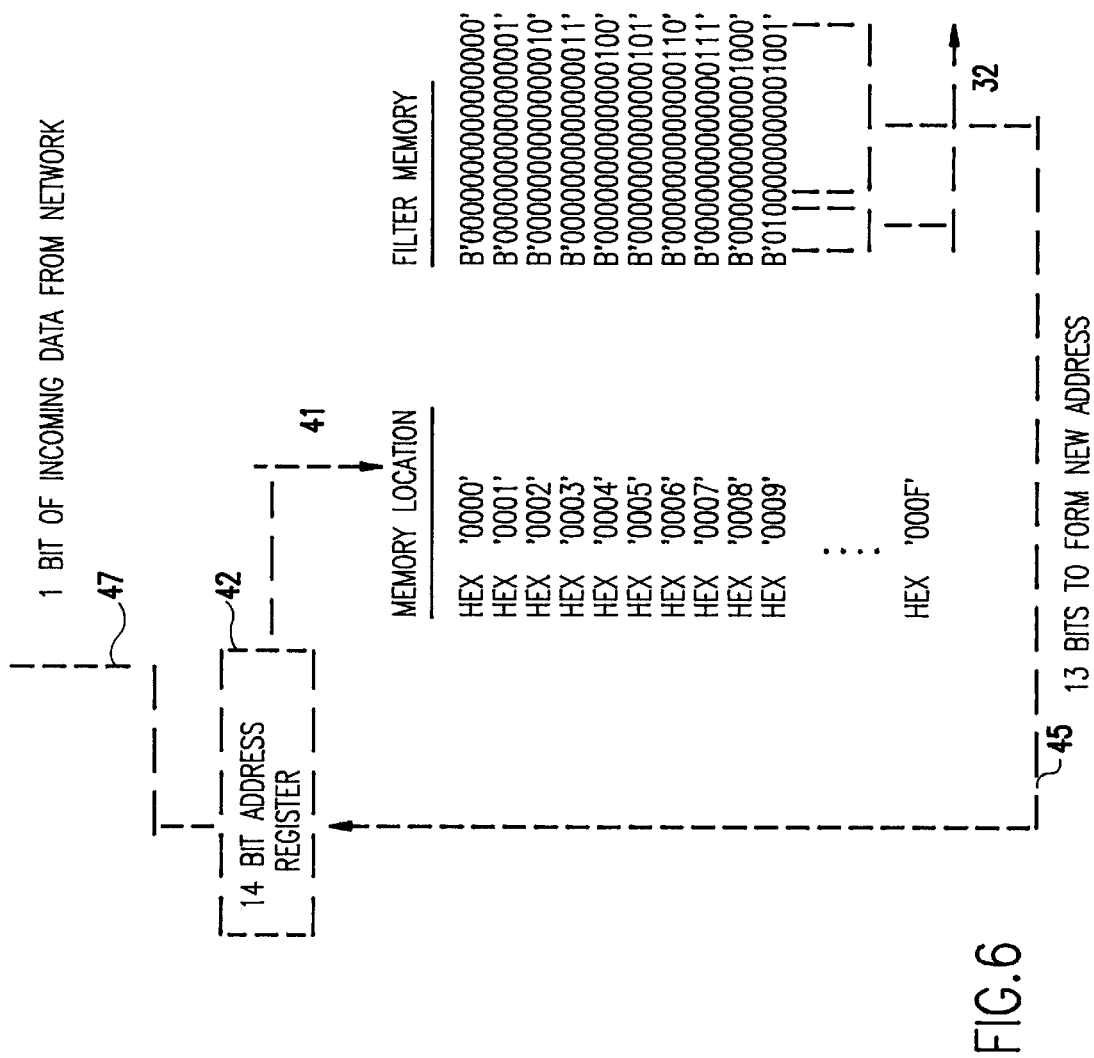
FIG. 6 illustrates the method used by the event driven interface to filter and identify data.

This process is illustrated in FIG. 6. It begins with the address register 42 containing all zeros. The first and most significant bit of the B'00001001' string contained in the first byte of the information field 77, i.e. a B'0', enters the address register 42 from the token ring network 14 via line 47 and the address register 42 concatenates it as the least significant bit with the other 13 bits in the address register 42. After this concatenation, the address register 42 still has all zeros in it, and this is used to address the RAM 41 at memory location HEX '0000'. Memory location Hex '0000' contains the value B'0000000000000000', and the least significant 13 bits of this value are transferred to the address register 42 to form the thirteen most significant bits of the next address. Since the first four bits of the incoming string B'00001001' are B'0', this pattern repeats itself for those bits.

When the fifth bit of the first byte of the information field 77, i. e. a B'1', enters the event driven interface 30 from the token ring network 14, it becomes the least significant bit of the address register 42. This results in the formation of the address Hex '0001', and Hex '0001' is addressed in the RAM 41. The thirteen least significant bits of RAM memory Hex '0001', i. e. B'0000000000001', are used to form the thirteen most significant bits of the next address in the address register 42. The event driven interface 30 concatenates the next incoming bit, i. e. a B'0', from the token ring network 14 as the least significant bit to form the next address B'00000000000010', or Hex '0002'. The thirteen least significant bits from location Hex '0002' in the RAM 41 are transferred to the address register 42, and the next incoming bit B'0' from the token ring network 14 forms the next address. The address formed is Hex '0004', and this memory location is then accessed in the RAM 41. The last bit, a B'1', causes memory location Hex '0009' to be accessed. It is at this point that the event driven interface 30 has identified this network frame 70 as a frame which the event driven interface 30 should process by the fact that the write bit, in this instance the second most significant bit, is enabled.

The event driven interface 30 must now extract the critical information from the information field 77. The event driven interface 30 executes this in one of two alternative manners. The event driven interface 30 recognizes the end of the data in the information field 77 by being configured to process a certain number of bits such as the number of bits needed to represent a social security number, or by being configured to recognize the end marker 62 of the frame format 60.

While the invention has been described in terms of the aforementioned embodiments, those skilled in the art will recognize that the invention can be practiced with modification within the spirit and scope of the appended claims.

Having thus described our invention, what we claim as new and desire to secure by Letters Patent is as follows:

1. A system for processing information from a scanned document, said information being in a computer compatible digital code as a result of processing by character recognition software, comprising in combination:

an event driven interface including an input and an output;
means to couple said computer compatible digital code to said input as a bit serial data stream;

said event driven interface including a random access memory (RAM) loaded with a plurality of bit patterns indicating characters in key words in said scanned document, said characters stored in respectively addressable locations in said RAM and including bit patterns with a write enable bit to mark where succeeding data bits in said bit serial data stream are to be coupled to the output of said event driven interface;

an address generator for generating addresses to address said bit patterns by concatenating a bit from said computer compatible digital code with a bit pattern just previously in said RAM so that successive bits in said bit serial data stream address successive bit patterns in said RAM including a bit pattern with a write enable bit; and storing said bit serial data stream passed from the input to the output of said event driven interface in response to addressing in said RAM said bit pattern with a write enable bit.

* * * * *